United States Patent
Carlsson et al.

(10) Patent No.: US 11,442,111 B2
(45) Date of Patent: Sep. 13, 2022

(54) SYSTEM AND METHOD FOR DETERMINING DEGRADATION DEPENDENT OPEN CELL VOLTAGE FOR CATHODE MATERIALS

(71) Applicant: Dassault Systemes Americas Corp., Waltham, MA (US)

(72) Inventors: Johan Carlsson, Cologne (DE); Kwan Skinner, Gilbert, AZ (US); Michael Doyle, Inverness, FL (US); Nick Reynolds, Newton, MA (US); Lalitha Subramanian, Newtown, PA (US); Felix Hanke, Bedford (GB)

(73) Assignee: DASSAULT SYSTEMES AMERICAS CORP., Waltham, MA (US)

( * ) Notice: Subject to any disclaimer, the term of this patent is extended or adjusted under 35 U.S.C. 154(b) by 0 days.

(21) Appl. No.: 17/184,249

(22) Filed: Feb. 24, 2021

(65) Prior Publication Data

US 2021/0286015 A1  Sep. 16, 2021

Related U.S. Application Data

(60) Provisional application No. 62/987,583, filed on Mar. 10, 2020.

(51) Int. Cl.
 *G01R 31/392*  (2019.01)
 *G01R 31/367*  (2019.01)
 (Continued)

(52) U.S. Cl.
 CPC ......... *G01R 31/392* (2019.01); *G01R 31/367* (2019.01); *H01M 10/4285* (2013.01); *H01M 10/48* (2013.01)

(58) Field of Classification Search
 CPC .............. G01R 31/392; G01R 31/367; H01M 10/4285; H01M 10/48
 See application file for complete search history.

(56) References Cited

U.S. PATENT DOCUMENTS

| | | | |
|---|---|---|---|
| 2012/0130690 A1* | 5/2012 | Srivastava | G16C 20/30 703/2 |
| 2012/0130691 A1* | 5/2012 | Li | H01M 10/052 703/2 |

(Continued)

FOREIGN PATENT DOCUMENTS

WO  2019/177992 A1  9/2019

OTHER PUBLICATIONS

European Search Report for International Application No. EP 21 16 0361.8, entitled "System and Method for Determining Degradation Dependent Open Cell Voltage for Cathode Materials," consisting of 2 pages. dated Jul. 27, 2021.

(Continued)

*Primary Examiner* — Raymond L Nimox
(74) *Attorney, Agent, or Firm* — Hamilton, Brook, Smith & Reynolds, P.C.

(57) ABSTRACT

An automated system and method to investigate degradation of cathode materials in batteries via atomistic simulations, and in particular by simulating the creation of atomistic defects in the cathode material, which occurs during charge cycling. A systematic procedure relates the degradation of battery performance metrics to underlying structural changes due to atomic rearrangements within the material, for example through density functional theory simulations. The performance metrics modeled with this approach include the Open Cell Voltage (OCV) as well as the discharge capacity curve.

21 Claims, 11 Drawing Sheets

(51) Int. Cl.
    *H01M 10/42*    (2006.01)
    *H01M 10/48*    (2006.01)

(56) References Cited

U.S. PATENT DOCUMENTS

2012/0130692 A1* 5/2012 Li ..................... H01M 10/00
                                                         703/2
2012/0130694 A1* 5/2012 Srivastava ........... G16Z 99/00
                                                         703/6
2017/0293707 A1* 10/2017 Xin .................... H01M 4/1391

OTHER PUBLICATIONS

Extended European Search Report for International Application No. EP 21 16 0361.8, entitled "System and Method for Determining Degradation Dependent Open Cell Voltage for Cathode Materials," consisting of 5 pages. dated Aug. 4, 2021.

A. Van der Ven et al., "Ordering in $Li_x(Ni0.5Mn0.5)O_2$ and its relation to charge capacity and electrochemical behavior in rechargeable lithium batteries." Electrochemistry Communications 6 (2004) 1045-1050.

Keke Chang et al., "Thermodynamic description of the $LiNiO_2$—$NiO_2$ pseudo-binary system and extrapolation to the Li (Co, Ni)$O_2$—(Co, Ni)$O_2$ system," Computer Coupling of Phase Diagrams and Thermochemistry 37 (2012) 100-107.

Fantai Kong et al., "Conflicting Roles of Anion Doping on the Electrochemical Performance of Li-Ion Battery Cathode Materials," Chem. Mater. 2016, 28, 6942-6952.

Khang Hoang et al., "Defect chemistry in layered transition-metal oxides from screened hybrid density functional calculations," J. Mater. Chem. A, 2014, 2, 5224.

Hongyang Li et al, "Updating the Structure and Electrochemistry of $Li_xNiO_2$ for $0 \leq x \leq 1$ Journal of The Electrochemical Society," 165 (13) A2985-A2993 (2018).

G. Ceder et al, "The electrochemical stability of lithium-metal oxides against metal reduction," Solid State Ionics 109 (1998) 151-157.

* cited by examiner

Open Cell Voltage Determination Module

318

$$V_{OCV}(x) = \frac{\mu_{Cathode}(x) - \mu_{Alkali\ metal\ Ref}}{zF}$$

$$V_{OCV}(x) = \frac{\{E_{Total}[A(1+x)MO_2] + \mu_{Alkali\ metal\ Ref}\} - E_{Total}[AMO_2]}{z}$$

FIG. 3

SYSTEM AND METHOD FOR DETERMINING DEGRADATION DEPENDENT OPEN CELL VOLTAGE FOR CATHODE MATERIALS

RELATED APPLICATION

This application claims the benefit of U.S. Provisional Application No. 62/987,583, filed on Mar. 10, 2020. The entire teachings of the above application are incorporated herein by reference.

BACKGROUND

Those wishing to study and optimize the performance of potential cathode materials for batteries typically perform experimental observations of physically occurring phenomena of the batteries. There is modeling work in the computational literature, but it conventionally addresses modeling of batteries in a pristine state, before the batteries have been degraded by charging and discharging. Conventional modeling of batteries includes studies of the compositions of particular materials (1), the voltage curve in an idealized reversible charge cycle (2), and defect formation in an idealized stoichiometric material before cycling (3, 4).

There is, however, an ongoing need to predict the extent of degradation that one may expect to observe in battery materials during operation of the battery, such as during repeated lithiation and delithiation of a lithium-ion battery.

SUMMARY

An embodiment according to the invention provides an automated system and method to investigate degradation of cathode materials in batteries via atomistic simulations, and in particular by simulating the creation of atomistic defects in the cathode material, which occurs during charge cycling. A systematic procedure relates the degradation of battery performance metrics to underlying structural changes due to atomic rearrangements within the material, for example through density functional theory simulations. The performance metrics modeled with this approach include the Open Cell Voltage (OCV) as well as the discharge capacity curve.

One embodiment according to the invention is a computer-implemented method of determining a degradation dependent open cell voltage for a cathode material of a battery. The computer-implemented method comprises determining, in a manner automated by a processor, a degradation dependent model of the cathode material during operation of the battery. The degradation dependent model is stored in a first data structure by the processor and comprises: (i) possible atomic configurations of the cathode material during operation of the battery at each of a plurality of stoichiometries or capacities of the cathode material, the possible atomic configurations comprising configurations with degradation defects produced by atomic rearrangements within the cathode material during operation of the battery, and (ii) the total energy of the possible atomic configurations. A lowest total energy atomic configuration of the cathode material and associated lowest total energy at each of the plurality of stoichiometries or capacities is determined and stored in a second data structure. The determining of the lowest total energy atomic configuration is performed by the processor in an automated manner based on the degradation dependent model, stored in the first data structure, of the cathode material during operation. An open cell voltage of the cathode material at each stoichiometry or capacity is determined and stored in a third data structure. The determining of the open cell voltage is performed by the processor in an automated manner based on the lowest total energy at each stoichiometry or capacity, stored in the second data structure.

In further, related embodiments, the configurations with degradation defects may comprise configurations with partial or complete blockage of charge carrying sites within the cathode material, the atomic rearrangements comprising the partial or complete blockage of the charge carrying sites during operation of the battery. The configurations with partial or complete blockage of the charge carrying sites may comprise configurations with anti-sites formed by exchange of position of a transition metal atom with an alkali ion. The configurations may comprise a framework of transition metal atoms from which alkali metal ions are removed during charging, and into which alkali metal ions can be replaced during discharging unless blocked by the degradation defects. The determining and storing in the third data structure of the open cell voltage of the cathode material at each stoichiometry or capacity may comprise determining, in an automated manner using the processor, a difference in chemical potential of a charge carrier in the cathode material versus a reference charge carrier electrode as a function of the charge carrier concentration. The cathode material may comprise a transition metal and an alkali ion, and the stoichiometry may comprise concentration of the alkali ion.

In other related embodiments, determining the degradation dependent model may comprise determining, in an automated manner using the processor, the possible atomic configurations using a probabilistic model, and storing the possible atomic configurations in the first data structure. Determining the degradation dependent model may comprise determining, in an automated manner using the processor, the possible atomic configurations using at least one of: a Monte Carlo method, a genetic algorithm, and an enumeration search; and storing the possible atomic configurations in the first data structure. Determining the degradation dependent model may comprise modeling the atomic configurations, in an automated manner using the processor, using a quantum mechanical model of atoms of the cathode material. The quantum mechanical model may comprise a model based on density functional theory, implemented in an automated manner using the processor.

In another related embodiment, the method may further comprise: determining, in an automated manner using the processor, and storing in the third data structure, an open cell voltage of a first cathode material at each stoichiometry or capacity; determining, in an automated manner using the processor, and storing in a fourth data structure, an open cell voltage of a second cathode material at each stoichiometry or capacity; comparing, in an automated manner using the processor, an open cell voltage of the first cathode material from the third data structure with an open cell voltage of the second cathode material from the fourth data structure, and storing a result of the comparing in a fifth data structure; and reporting, in an automated manner using the processor, the result of the comparing of the open cell voltage of the first cathode material with the open cell voltage of the second cathode material.

Another embodiment according to the invention is a computer system for determining a degradation dependent open cell voltage for a cathode material of a battery. The computer system comprises a degradation dependent modeling module configured to determine, in a manner automated by a processor, a degradation dependent model of the cathode material during operation of the battery, and to use the processor to store in memory the degradation dependent model in a first data structure. The first data structure comprises: (i) possible atomic configurations of the cathode material during operation of the battery at each of a plurality of stoichiometries or capacities of the cathode material, the possible atomic configurations comprising configurations with degradation defects produced by atomic rearrangements within the cathode material during operation of the battery, and (ii) the total energy of the possible atomic configurations. A stable configuration module is configured to determine and store in memory in a second data structure a lowest total energy atomic configuration of the cathode material and associated lowest total energy at each of the plurality of stoichiometries or capacities. The stable configuration module is configured to determine the lowest total energy atomic configuration and associated lowest total energy using the processor in an automated manner based on the degradation dependent model, stored in the first data structure, of the cathode material during operation. An open cell voltage determination module is configured to determine and store in memory in a third data structure an open cell voltage of the cathode material at each stoichiometry or capacity. The open cell voltage determination module is configured to determine the open cell voltage using the processor in an automated manner based on the lowest total energy at each stoichiometry or capacity, stored in the second data structure.

In further related computer system embodiments, the configurations with degradation defects may comprise configurations with partial or complete blockage of charge carrying sites within the cathode material, the atomic rearrangements comprising the partial or complete blockage of the charge carrying sites during operation of the battery. The configurations with partial or complete blockage of the charge carrying sites may comprise configurations with anti-sites formed by exchange of position of a transition metal atom with an alkali ion. The configurations may comprise a framework of transition metal atoms from which alkali metal ions are removed during charging, and into which alkali metal ions can be replaced during discharging unless blocked by the degradation defects. The open cell voltage determination module may be configured to determine the open cell voltage of the cathode material at each stoichiometry or capacity by determining, in an automated manner using the processor, a difference in chemical potential of a charge carrier in the cathode material versus a reference charge carrier electrode as a function of the charge carrier concentration. The cathode material may comprise a transition metal and an alkali ion, and the stoichiometry may comprise concentration of the alkali ion.

In other related computer system embodiments, the degradation dependent modeling module may be configured to determine the degradation dependent model by determining, in an automated manner using the processor, the possible atomic configurations using a probabilistic model, and to store in memory the possible atomic configurations in the first data structure. The degradation dependent modeling module may be configured to determine the degradation dependent model by determining, in an automated manner using the processor, the possible atomic configurations using at least one of: a Monte Carlo method, a genetic algorithm, and an enumeration search; and to store in memory the possible atomic configurations in the first data structure. The degradation dependent modeling module may be configured to determine the degradation dependent model by modeling the atomic configurations, in an automated manner using the processor, using a quantum mechanical model of atoms of the cathode material. The quantum mechanical model may comprise a model based on density functional theory, implemented in an automated manner using the processor.

In another related computer system embodiment, the computer system may further comprise: a cathode materials comparison module configured to compare, in an automated manner using the processor, an open cell voltage of a first cathode material from the third data structure with an open cell voltage of a second cathode material from a fourth data structure, and to store in memory a result of the comparing in a fifth data structure; and a reporting module configured to report, in an automated manner using the processor, the result from the fifth data structure of the comparing of the open cell voltage of the first cathode material with the open cell voltage of the second cathode material.

Another embodiment according to the invention is a non-transitory computer-readable medium configured to store instructions for determining a degradation dependent open cell voltage for a cathode material of a battery, the instructions, when loaded into working memory and executed by a processor, cause the processor to determine the degradation dependent open cell voltage for the cathode material of the battery by: determining, in a manner automated by a processor, a degradation dependent model of the cathode material during operation of the battery, the degradation dependent model being stored in a first data structure by the processor and comprising: (i) possible atomic configurations of the cathode material during operation of the battery at each of a plurality of stoichiometries or capacities of the cathode material, the possible atomic configurations comprising configurations with degradation defects produced by atomic rearrangements within the cathode material during operation of the battery, and (ii) the total energy of the possible atomic configurations; determining and storing in a second data structure a lowest total energy atomic configuration of the cathode material and associated lowest total energy at each of the plurality of stoichiometries or capacities, the determining being performed by the processor in an automated manner based on the degradation dependent model, stored in the first data structure, of the cathode material during operation; and determining and storing in a third data structure an open cell voltage of the cathode material at each stoichiometry or capacity, the determining being performed by the processor in an automated manner based on the lowest total energy at each stoichiometry or capacity, stored in the second data structure.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3 is a schematic block diagram of an open cell voltage determination module in accordance with an embodiment of the invention.

DETAILED DESCRIPTION

A description of example embodiments follows.

An embodiment addresses the technical problem of understanding why battery performance degrades during charge cycling due to irreversible changes in the atomic structure of the battery cathode material. It is useful in predicting the extent of degradation one may expect to observe due to atomic rearrangements within a battery material during operation of the battery, such as during lithiation and delithiation in a lithium ion battery. A system and method automatically simulates how cathode materials in batteries degrade during repeated charging and discharge cycles. By contrast, conventional research and knowledge is based on experimental investigations, which clearly show the degradation behavior, but are unable to reveal the atomistic processes leading to the observed effects in a timely and cost-effective manner. By permitting battery degradation to be simulated, an embodiment can, for example, permit investigators to avoid costly and time-consuming experimental investigations and focus efforts on cathode materials that are likely to meet desired battery performance criteria.

A systematic method is used to investigate the degradation processes via atomistic simulations. The method can, for example, simulate the creation of atomistic defects occurring during charge cycling, to model how defect formation impacts battery performance from a first-principles Density Functional Theory (DFT) approach, as the material is charge cycled.

The performance metrics modeled with this approach can include the Open Cell Potential or Open Cell Voltage (OCV) as well as the discharge capacity curve. Previous techniques can model the voltage of a material as a function of capacity or material composition, based on a pristine material. This provides the practitioner an idea of the initial performance of the material in a battery cell, but does not address how the material will perform after multiple charge/discharge cycles as the battery has aged due to use. By contrast with conventional techniques, embodiments taught herein can determine a degradation dependent open cell voltage, and can predict performance characteristics for both the pristine battery material and for the aged battery material.

Figure 1:
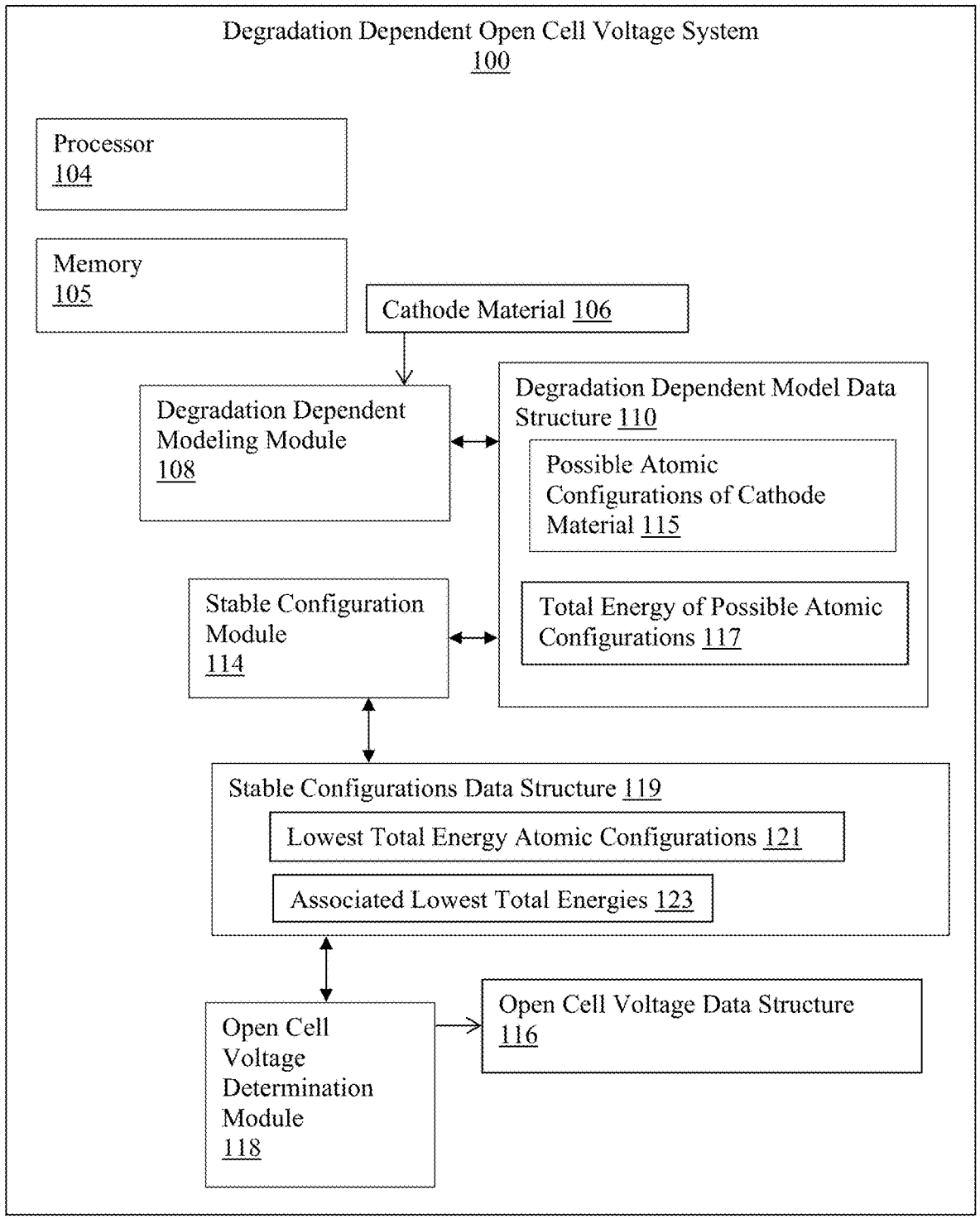
FIG. 1 is a schematic block diagram of a computer system for determining a degradation dependent open cell voltage for a cathode material of a battery, in accordance with an embodiment of the invention.

FIG. 1 is a schematic block diagram of a computer system 100 for determining a degradation dependent open cell voltage for a cathode material of a battery, in accordance with an embodiment of the invention. The computer system 100 includes a processor 104 and a memory 105, which stores computer code instructions. The processor 104 and the memory 105, with the computer code instructions, are configured to implement: a degradation dependent modeling module 108, a stable configuration module 114, and an open cell voltage determination module 118. In addition, in other embodiments according to the invention, the processor 104 and memory 105 may be configured to implement one or more of: open cell voltage determination module 318 (see FIG. 3); degradation dependent modeling module 408 (see FIG. 4) and its modules 450, 452, 454, 456, 458 and 460; and degradation dependent open cell voltage system 500 and its modules 508, 514, 518, 562 and 566 (see FIG. 5). It will be appreciated that processor 104 and memory 105 may be implemented on one or more separate processors and one or more separate memories, any combination of which cooperate together to implement all or a portion of embodiments herein.

In the embodiment of FIG. 1, the computer system 100 comprises a degradation dependent modeling module 108 configured to automatically determine a degradation dependent model of the cathode material 106 during operation of a battery, and to use the processor 104 to store the degradation dependent model in a degradation dependent model data structure 110. The degradation dependent model data structure 110 comprises possible atomic configurations 115 of the cathode material 106 during operation of the battery at each of multiple stoichiometries or capacities of the cathode material 106. The possible atomic configurations 115 include configurations with degradation defects produced by atomic rearrangements within the cathode material during operation of the battery. The degradation dependent model data structure 110 also includes the total energy 117 of the possible atomic configurations 115. A stable configuration module 114 is configured to determine and store in a stable configurations data structure 119 a lowest total energy atomic configuration 121 of the cathode material and associated lowest total energy 123 at each of the multiple stoichiometries or capacities. The stable configuration module 114 is configured to determine the lowest total energy atomic configuration 121 and associated lowest total energy 123 using the processor 104 in an automated manner based on the degradation dependent model, stored in the data structure 110. An open cell voltage determination module 118 is configured to determine and store in an open cell voltage data structure 116 an open cell voltage of the cathode material at each stoichiometry or capacity. The open cell voltage determination module 118 is configured to determine the open cell voltage using the processor 104 in an automated manner based on the lowest total energy 123 at each stoichiometry or capacity, stored in the data structure 119.

Figure 2A:
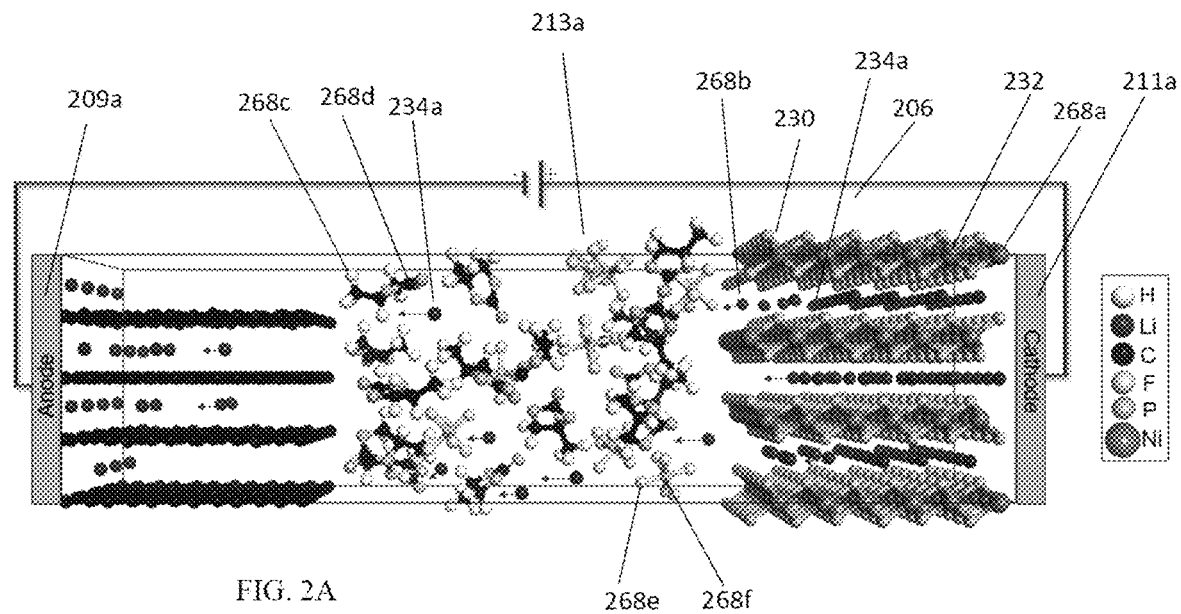
FIG. 2A is a schematic diagram illustrating an example of the atomic process of charging a battery cell.
Figure 2B:
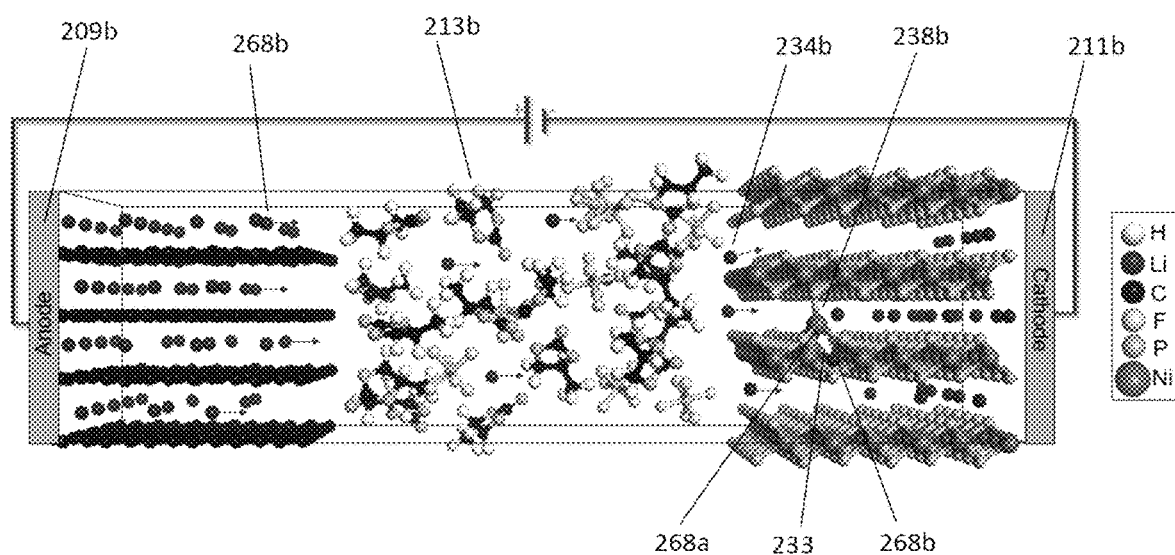
FIG. 2B is a schematic diagram illustrating an example of the atomic process of discharging a battery cell.

FIG. 2A is a schematic diagram illustrating an example of the atomic process of charging a battery cell, and FIG. 2B is a schematic diagram illustrating an example of the atomic process of discharging a battery cell. The battery cell of FIG. 2A contains a graphite type anode 209a/209b and a Li-transition metal oxide cathode 211a/211b. The electrolyte 213a/213b consists of a mixture of propylene carbonate and LiPF$_6$. The solid-electrolyte interface (SEI) is omitted for clarity. The shading of the elements is as follows: H (268c, white), Li (268b, dark grey), C (268d, black), F (268e, light gray), P (268f, medium grey) and transition metal (Ni, 268a, large grey atoms) as indicated in the caption. The positive potential is applied to the cathode 211a during charging to drive the Li-ions 268b from the cathode 211a into the anode 209a. FIG. 2B shows the battery cell of FIG. 2A, during discharging. In the discharging of FIG. 2B, closing the circuit of the anode 209b and cathode 211b over a load will allow the Li-ions 268b stored in the graphite anode 209b to diffuse back into the cathode 211b. However, Ni-atoms 268a may move into the Li-layer to swap positions with the Li-ions 268b as indicated by the white arrow 233 in FIG. 2B. This creates an Ni—Li anti-site 238b. These anti-sites 238b trap Li-ions in the metal oxide layer and block active Li-sites in the Li-layer.

The schematic diagrams of FIGS. 2A and 2B illustrate a battery cathode material 206 (like those of 106 in FIG. 1) whose degradation dependent behavior can be modeled. The cathode material 206 comprises a configuration of atoms 230, which can be a framework of transition metal atoms 232 (such as nickel atoms 268a) from which alkali metal ions 234a (such as lithium ions 268b) are removed during charging, as in FIG. 2A, and into which alkali metal ions 234b can be replaced during discharging, as in FIG. 2B, unless they are blocked by degradation defects. When a degradation defect occurs, the site 238b can become what is known as an anti-site in the configuration of atoms. An anti-site is an example of a defect within the cathode material 206 formed by a partial or complete blockage of a charge carrying site 238b by an atomic rearrangement 233 during operation of the battery. Other complex rearrangements can also block charge carrying sites. In one example, anti-sites 238b can be formed by exchange of position of a transition metal atom 232 with an alkali ion 234a/234b. The performance of a cathode material 206 is affected by its stoichiometry, which can, for example, include the concentration of alkali ions 234a/234b.

FIG. 3 is a schematic block diagram of an open cell voltage determination module 318, which can be used as the open cell voltage determination module 118 (see FIG. 1), in accordance with an embodiment of the invention. The open cell voltage determination module 318 is configured to determine the open cell voltage of the cathode material at each stoichiometry or capacity by determining, in an automated manner using the processor (such as 104 of FIG. 1), a difference in chemical potential of a charge carrier in the cathode material versus a reference charge carrier electrode as a function of the charge carrier concentration. For example, the open cell voltage determination module 318 can use either of Equations (1) or (2), taught herein, as shown in FIG. 3, implemented in an automated fashion by a computer processor as taught herein.

Figure 4:
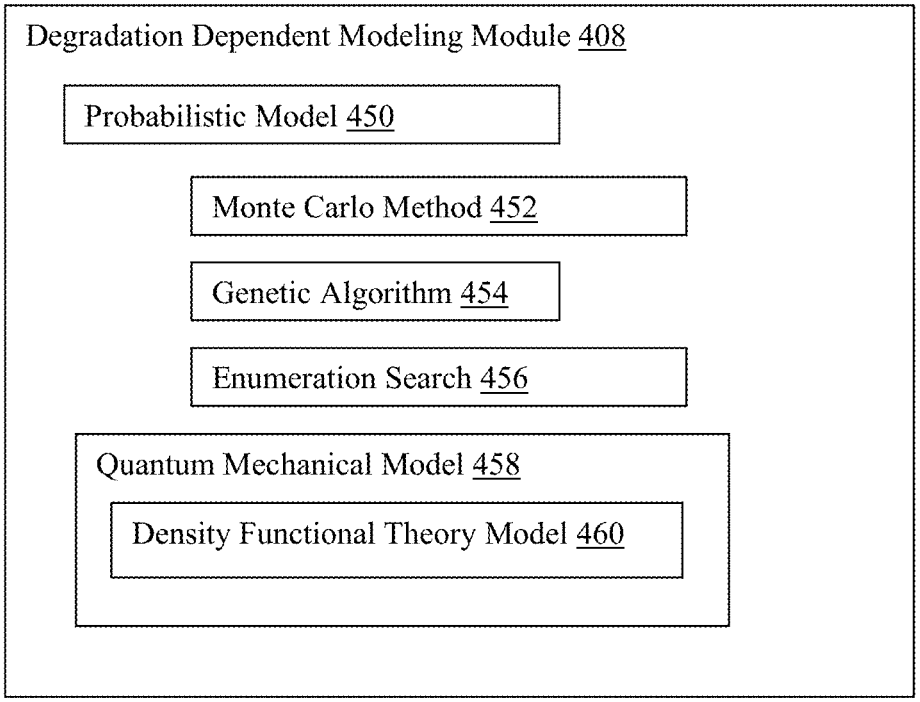
FIG. 4 is a schematic block diagram of a degradation dependent modeling module in accordance with an embodiment of the invention.

FIG. 4 is a schematic block diagram of a degradation dependent modeling module 408 in accordance with an embodiment of the invention, which can be used as the degradation dependent modeling module 108 (see FIG. 1). The degradation dependent modeling module 408 of FIG. 4 can be configured to determine the degradation dependent model by determining, in an automated manner using the processor 104 (see FIG. 1), the possible atomic configurations using a probabilistic model 450, and to store the determined possible atomic configurations 115 in the degradation dependent model data structure 110 (see FIG. 1). The degradation dependent modeling module 408 can be configured to determine the degradation dependent model by determining, in an automated manner using the processor, the possible atomic configurations using at least one of: a Monte Carlo method 452, a genetic algorithm 454, and an enumeration search 456 (such as a complete enumeration search or partial enumeration of structures through a cluster expansion); and to store the determined possible atomic configurations 115 in the degradation dependent model data structure 110 (see FIG. 1). The degradation dependent modeling module 408 can also be configured to determine the degradation dependent model by modeling the atomic configurations, in an automated manner using the processor, using a quantum mechanical model 458 of atoms of the cathode material 106. The quantum mechanical model 458 can be or include a model 460 based on density functional theory, implemented in an automated manner using the processor, or another quantum mechanical model. It will be appreciated that other probabilistic models, techniques of determining possible configurations, and atomic models, can be used. From the formed models of the atomic configurations 115, the degradation dependent modeling module 408 computes and provides the amount of total energy 117 as stored in the degradation dependent model data structure 110 (FIG. 1).

Figure 5:
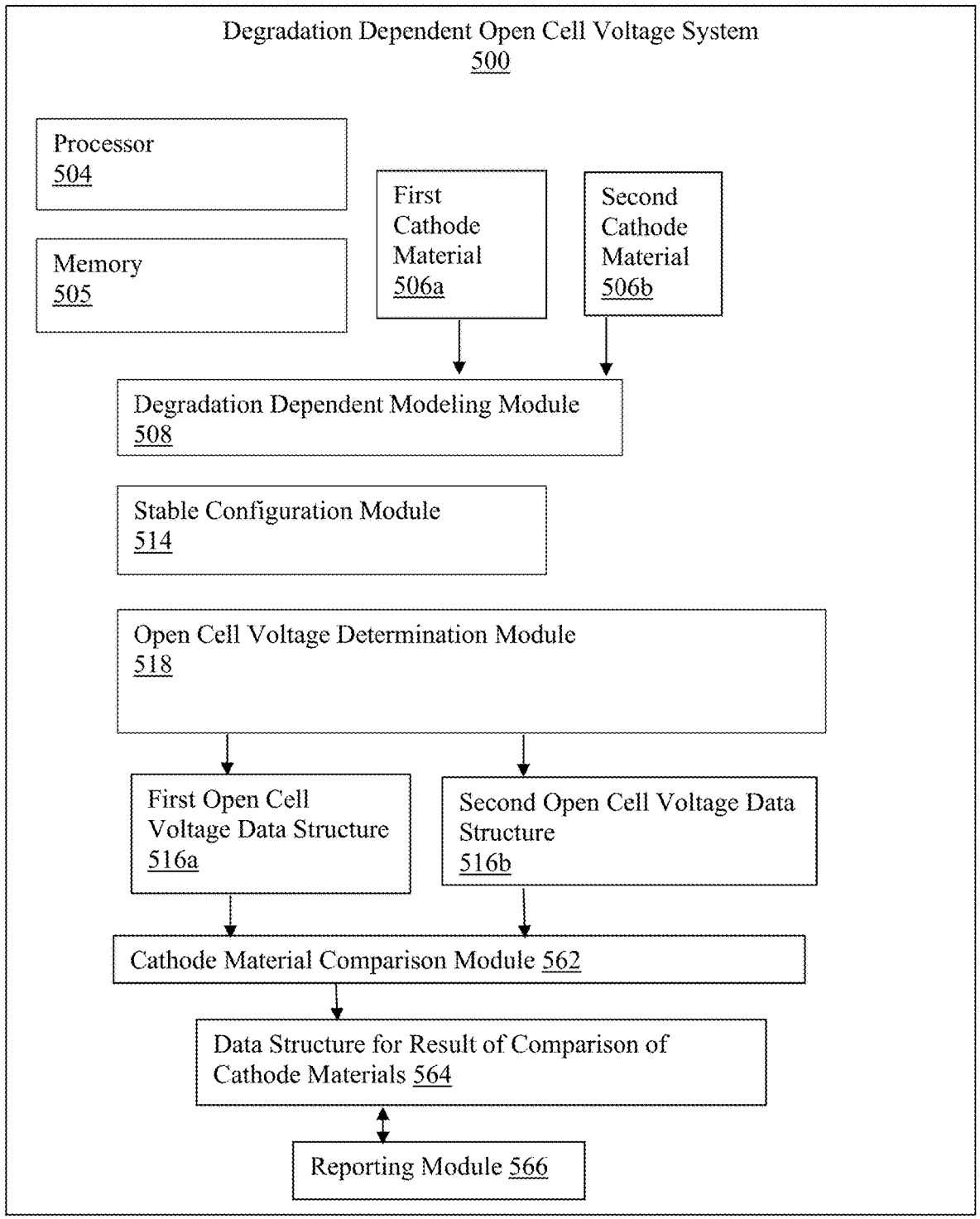
FIG. 5 is a schematic block diagram illustrating a cathode material comparison module and reporting module in accordance with an embodiment of the invention.

FIG. 5 is a schematic block diagram illustrating a cathode material comparison module 562 and reporting module 566 in accordance with an embodiment of the invention. These modules can be used in conjunction with the components of FIG. 1, which are here shown (without associated data structures) as processor 504, memory 505, and modules 508, 514 and 518. The cathode materials comparison module 562 is configured to compare, in an automated manner using the processor 504, an open cell voltage of a first cathode material 506a with an open cell voltage of a second cathode material 506b, each stored in respective data structures 516a/516b, and to store a result of the comparing in a data structure 564. The reporting module 566 is configured to report, in an automated manner using the processor 504, the result from the data structure 564 of the comparing of the open cell voltage of the first cathode material 506a with the open cell voltage of the second cathode material 506b. Using comparisons such as these, a user of the computer system 500 can quickly, and in automated way, determine characteristics of cathode materials 106, 506a, 506b by simulations, without the need to perform experiments. For example, a user of the computer system 500 can obtain understanding, and design choices, such as by determining which cathode material produces a greater open cell voltage and how the open cell voltage changes as a function of degradation of the cathode material during use of the battery over time. The degradation dependence of the open cell voltage can have consequences for the choice of cathode material, depending on the setting in which a battery is used. Thus, the design tradeoffs involved in a choice of cathode materials can be optimized using simulations by computer systems taught herein.

An embodiment allows predicting to what extent a battery will degrade due to irreversible atomic rearrangements of the cathode material 106, 506a, 506b. Previous attempts (see (2)) to model this in the literature involved density functional theory (DFT) calculations whereby the initial pristine material is modeled, along with how the performance metrics of the material change with changes in the stoichiometry of the material. These changes in stoichiometry result in changes in the storage capacity of the material. As the material is discharged, atomic rearrangements may become favorable which can not only result in phase changes but also irreversible defect formation. One defect of interest is the formation of anti-sites. These anti-sites can result in the reduction of the capacity of the subsequently charged material due to the partial or complete blockage of charge carrying sites being restored during the recharge phase of the material. The ability to predict the decrease in capacity due to the partial blockage of these previously accessible sites allows the practitioner to predict a priori whether a material composition will be less or more prone to significant degradation due to anti-site formation. Conventional practices for predicting this behavior involve lengthy experimental work (see, for example, (5)).

In one stage implemented by degradation dependent modeling module 108 (see FIG. 1), an embodiment can use the following process of model building. The cathode material changes stoichiometry during cycling, and a first step is to determine the exact position of the alkali ions 234a/234b during this process. In order to determine the stable structure for each alkali ion concentration a large number of configurations of the alkali ions needs to be generated. In addition, as described for FIGS. 2A and 2B, as alkali metal atoms 234a are removed and vacancies are created, other metal atoms may move into these previously occupied but now vacant alkali metal positions, so it is important to also include other more complex defect configurations than just alkali metal vacancies. Previous calculations have indicated that, for instance, anti-sites, where the alkali ions and the transition metal ions exchange sites, are low energy defects in the perfect stoichiometric material (3) (4). An embodiment includes configurations in the search for possible atomic configuration which model the creation of anti-sites during the charge cycles.

As described for FIG. 4, methods for generating these configurations can, for example, include Monte Carlo methods, genetic algorithms, and an enumeration search. The software solution Pipeline Pilot from Dassault Systemes BIOVIA of Waltham, Mass., U.S.A., can, for example, provide methods to efficiently generate such configurations. The alkali metal atoms can, for example, be one or more of lithium, sodium or potassium atoms. It will be appreciated that a wide variety of cathode materials can be modeled, including a variety of transition metals and alkali ions. The interaction of the valence electrons and ions of these materials can, for example, be calculated by quantum mechanical methods, such as density functional theory (DFT). The implementation can, for example, use a plane wave basis for the expansion of the wave function or similar methods, which can be based on Slater type orbitals or a tight binding implementation.

Experimental Example of Theoretical Calculations:

In an experimental simulation in accordance with an embodiment of the invention, a density functional theory (DFT) technique was used with a plane wave basis for the expansion of the wave function, set with an energy cut-off 600 eV. The exchange-correlation functional in the density functional theory can, for example, at least be a GGA type functional like the PBE, and can include a special treatment of the strong correlation in the transition metal oxide material used on the cathodes. An experiment used the GGA+U exchange-correlation functional. The reciprocal space was sampled by a resolution of 10 $Å^{-1}$. The iterative convergence criteria for the atomic relaxation were 10 meV/A for the forces on the atoms and 1 micro eV/atom for the energy change between successive iterations. The calculated total energies of all structures generated in the model building phase, were stored into a Microsoft® Excel sheet database together with the characteristics of each supercell. The characteristics included the number of atoms of each element, the cell volume and density, magnetic moment and charge. This information was used to calculate the open cell voltage as function of lithium concentration and the capacity of the material as a function of lithium concentration. This process can be automated by a dedicated processor implementing techniques taught herein.

Figure 6:
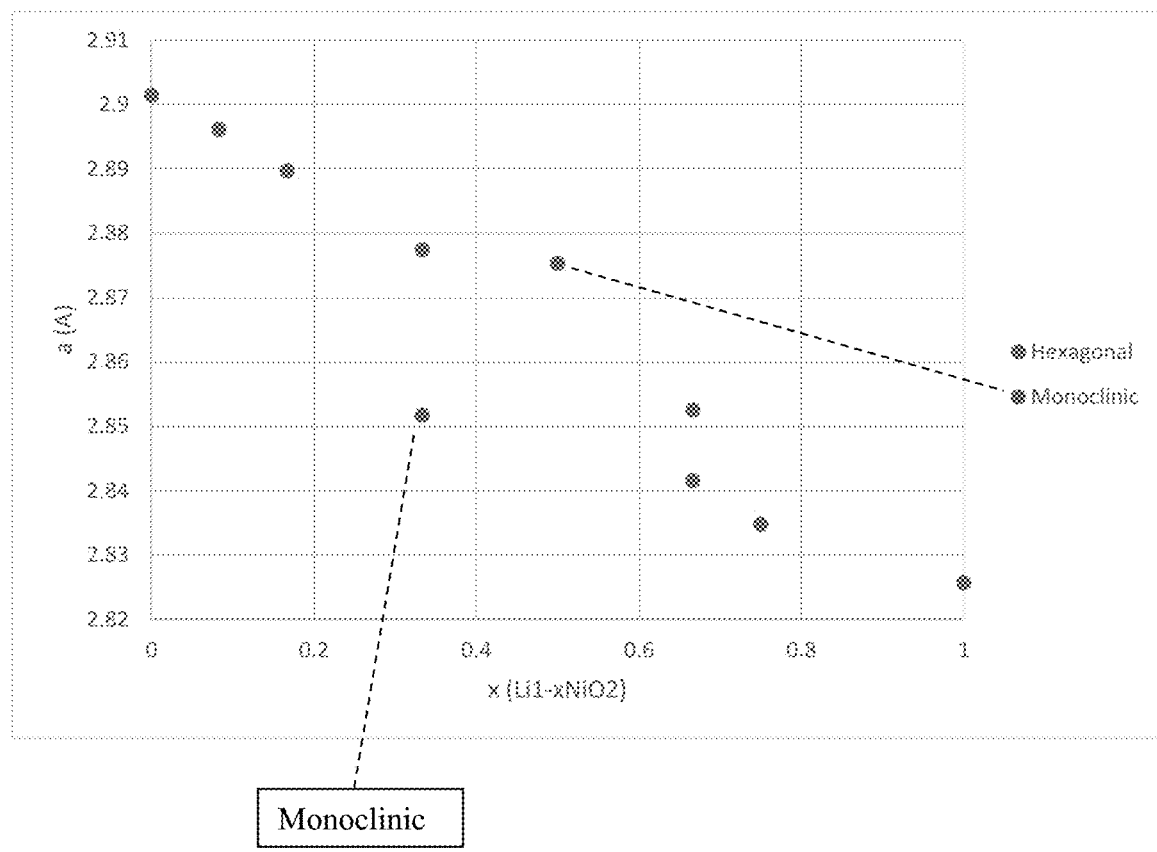
FIG. 6 is a graph showing lattice parameter versus alkali metal concentration for an example cathode material, in accordance with an embodiment of the invention.
Figure 7:
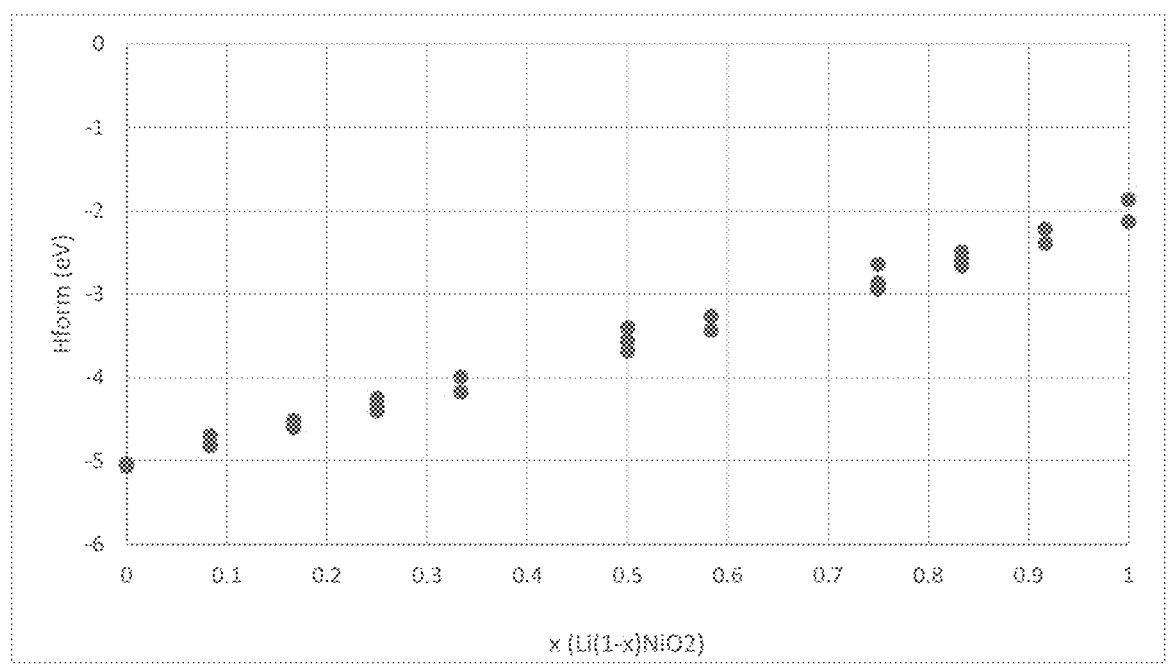
FIG. 7 is a graph showing total energy (heat of formation) for a large number of possible atomic configurations of alkali metal concentration, versus the alkali metal concentration, for an example cathode material, in accordance with an embodiment of the invention.

To predict battery performance, an embodiment can begin by determining the stable structures at each stoichiometry during cycling. This can be achieved, for example by stable configuration module 114, by relaxing the supercell and calculating the heat of formation of the different configurations generated during the model building phase, for example by modeling module 108. The lattice parameters of the relaxed supercells can be directly compared to the experimental lattice parameters to understand the volume expansion of the cathode materials during the cycling, as shown in FIG. 6. The configuration with the lowest heat of formation is predicted to be the most stable configuration at this particular stoichiometry as exemplified in FIG. 7.

Embodiments can determine the open cell potential, $V_{OCV}$, defined as the difference in chemical potential of the alkali metal ions in the cathode material versus a reference alkali metal electrode as a function of the alkali metal concentration, x (6).

$$V_{OCV}(x) = \frac{\mu_{Cathode}(x) - \mu_{Alkali\ metal\ Ref}}{zF} \quad \text{(Equation 1)}$$

where z is the charge of the alkali metal atoms and F is the Faraday constant.

This can, in the framework of density functional theory calculations, be calculated as $$V_{OCV}(x) = \frac{\{E_{Total}[A(1-x)MO_2] + \mu_{Alkali\ metal\ Ref}\} - E_{Total}[AMO_2]}{z} \quad \text{(Equation 2)}$$

where A is the Alkali metal and M is one or more transition metal elements. The open cell voltage can be calculated for each alkali metal concentration x using the structures created during the model building phase, for example by modules 108 and by lowest energy configurations determined by module 114, and plotted versus x to give the cell voltage as function of alkali metal concentration in FIG. 8.

A common representation of battery performance (in general) is the presentation of the open cell voltage as function of the capacity of the cathode material. The capacity C, is directly related to the alkali metal concentration in the cathode material x, and inverse to the weight of the material. The mass per unit may be calculated from the volume of the unit cell $\Omega$ and the density $\rho$, giving the expression for the capacity:

$$C(x) = \frac{x}{\Omega \rho}$$

Figure 9:
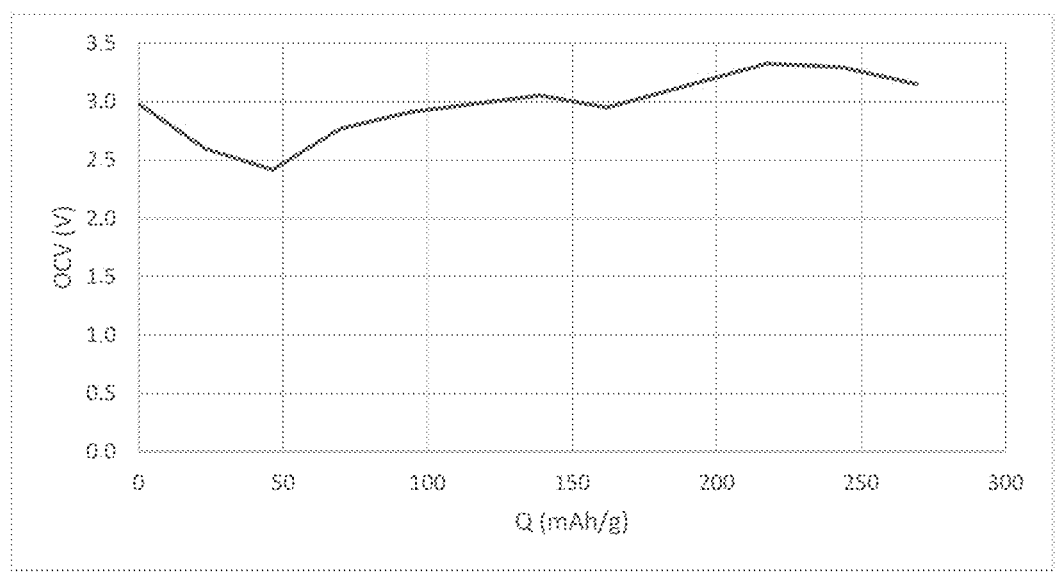
FIG. 9 is a graph showing open cell voltage versus capacity of the cathode material, determined in accordance with an embodiment of the invention.

Using an embodiment, the performance characteristics of the cathode material can now be simulated by calculating the open cell voltage versus the capacity according to the above equations, taking the structural changes, which occur during cycling, such as defect complex formation, into account, as shown in FIG. 9. As can be seen, the horizontal axis of FIG.

Figure 8:
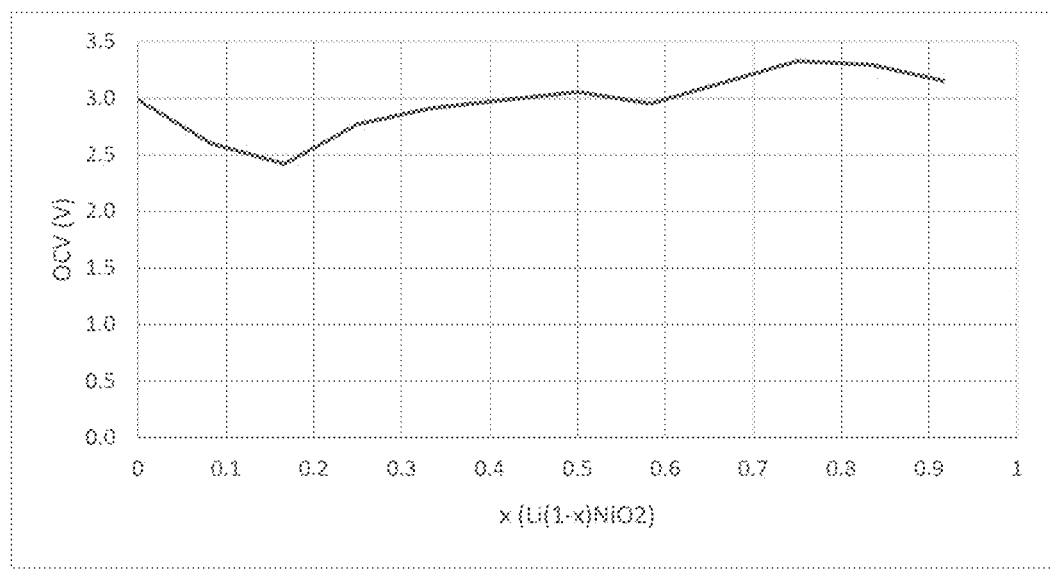
FIG. 8 is a graph showing open cell voltage versus alkali metal concentration, determined in accordance with an embodiment of the invention.

9 is a scaled version of that of FIG. 8, since the capacity scales with the alkali metal concentration (or other stoichiometry) that is shown in FIG. 8.

In one example, the following degradation procedure is assumed. The cathode material is more or less defect free during the first cycle. The delithiation process during charging remove the alkali metal ions in sequence and leave a skeleton of transition metal oxide. This gives the maximal capacity during the first cycle. The transition metal ion becomes mobile and may exchange sites with the alkali metal ions to form an anti-site defect complex. The alkali metal ions in the transition metal site (anti-site) is more tightly bound than in the alkali metal layer, such that the alkali metals are trapped in the transition metal oxide layer and are not available to participate in the charging and discharging processes. This decreases the capacity of the cathode material.

Using an embodiment, once the graph of FIG. 9 has been generated to create a plot representing the open cell voltage vs capacity for a single material, the user can calculate another plot for a different material to make relative comparisons between the materials, for example using the comparison and results modules 562, 566 of FIG. 5. For example, the calculated OCV curve of a material with composition A can be compared to material with composition B to determine which has the larger open cell voltage. A larger OCV is desirable for some end-user applications. Similarly, a smaller change in the simulated OCV curve as anti-sites are introduced is also desirable, as it represents a battery with a longer lifetime due to a smaller capacity fade. This information can also be determined from the simulation methodology described here. Additional comparisons can be made amongst a selected set of materials, and the most interesting ones can be targeted for synthetic work in the lab, since this often takes much longer to complete than the simulations do.

As one example, the Materials Studio software suite, sold by Dassault Systemes BIOVIA of Waltham, Mass., U.S.A., is used for model building, and the CASTEP module within the Materials Studio software suite is used for the calculations. Pipeline Pilot, sold by Dassault Systemes BIOVIA of Waltham, Mass., U.S.A., is used to aide in searching different configurations within the conformational space.

Figure 10:
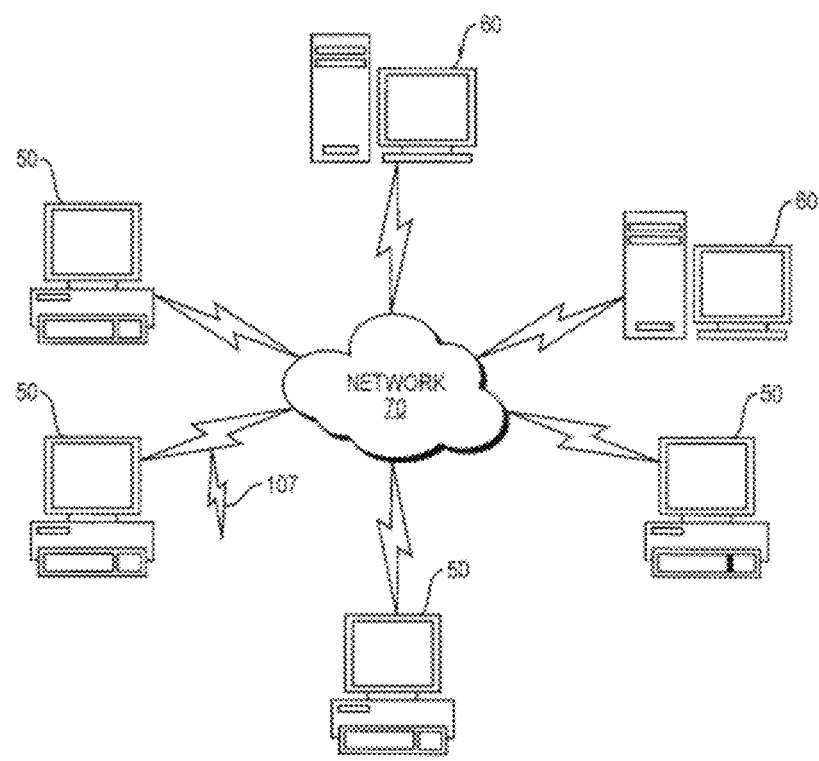
FIG. 10 illustrates a computer network or similar digital processing environment in which embodiments of the present invention may be implemented.

FIG. 10 illustrates a computer network or similar digital processing environment in which embodiments of the present invention may be implemented. Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 11:
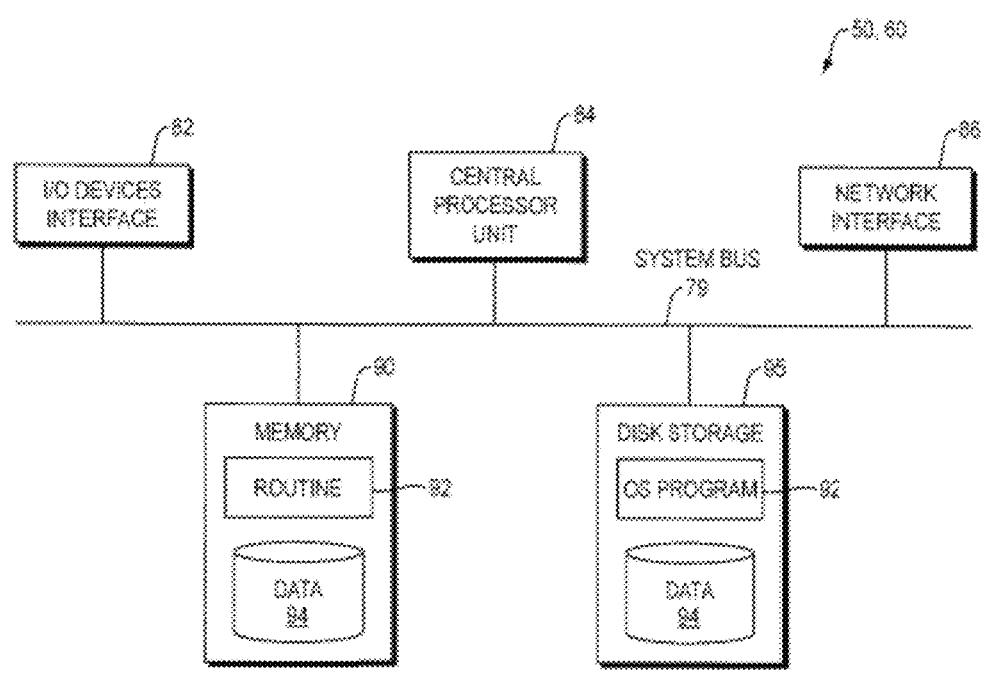
FIG. 11 is a diagram of an example internal structure of a computer (e.g., client processor/device or server computers) in the computer system of FIG. 10.

FIG. 11 is a diagram of an example internal structure of a computer (e.g., client processor/device 50 or server computers 60) in the computer system of FIG. 10. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 9). Memory 90 provides volatile storage for computer software instructions 92 and data 94 used to implement an embodiment of the present invention (including, for example, to implement one or more of: system 100, modules 108, 114, 118, 318, 408 and its models and methods, system 500 and its modules, and corresponding data structures 110, 114, 116, 516a, 516b, 564, detailed herein). Disk storage 95 provides non-volatile storage for computer software instructions 92 and data 94 used to implement an embodiment of the present invention. A central processor unit 84 is also attached to the system bus 79 and provides for the execution of computer instructions, for example having a flow of data and control as taught herein.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection 107. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

In other embodiments, the software instructions 92 and data 94 are provided on a cloud platform, as SaaS (Software as a Service), and the like.

REFERENCES

1. Ordering in $Li_x(Ni_{0.5}Mn_{0.5})O_2$ and its relation to charge capacity and electrochemical behavior in rechargeable lithium batteries. Van Der Ven, A. and Ceder G., 2004, Electrochemistry Communications, Bd. 6, S. 1045.
2. Thermodynamic description of the $LiNiO_2$—$NiO_2$ pseudo-binary system and extrapolation to the $Li(Co,Ni)O_2$—$(Co,Ni)O_2$ system. Chang K., Hallstedt B., and Music D. 2012, Calphad: Computer Coupling of Phase Diagrams and Thermochemistry, Bd. 37, S. 100.
3. Conflicting roles of anion doping on the electrochemical performance of Li-ion battery cathode materials. Kong F., Liang C., Longo R. C., Yeon D. H., Zheng Y., Park J. H., Doo S-G., and Cho K. 2016, Chemistry of Materials, Bd. 28, S. 6942.
4. Defect chemistry in layered transition-metal oxides from screened hybrid density functional calculations. M., Hoang K. and DeJohannes. 2014, J. Mater Chem. A, S. 5224.
5. Updating the Structure and Electrochemistry of $Li_xNiO_2$ for $0 \leq x \leq 1$. Li H., Zhang N., Li J., and Dahn J. R. 2018, Bd. 165, S. A2985.
6. The electrochemical stability of lithium-metal oxides against metal reduction. K., Ceder G. and Azdinol M. 1998, Bd. 109, S. 151.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of determining a degradation dependent open cell voltage for a cathode material of a battery, the computer-implemented method comprising:
    determining, in a manner automated by a processor, a degradation dependent model of the cathode material during operation of the battery, the degradation dependent model being stored in a first data structure by the processor and comprising: (i) possible atomic configurations of the cathode material during operation of the battery at each of a plurality of stoichiometries or capacities of the cathode material, the possible atomic configurations comprising configurations with degradation defects produced by atomic rearrangements within the cathode material during operation of the battery, the configurations with degradation defects comprising configurations with partial or complete blockage of charge carrying sites within the cathode material, the atomic rearrangements comprising the partial or complete blockage of the charge carrying sites during operation of the battery, and (ii) the total energy of the possible atomic configurations;
    determining and storing in a second data structure a lowest total energy atomic configuration of the cathode material and associated lowest total energy at each of the plurality of stoichiometries or capacities, the determining being performed by the processor in an automated manner based on the degradation dependent model, stored in the first data structure, of the cathode material during operation;
    determining and storing in a third data structure an open cell voltage of the cathode material at each stoichiometry or capacity, the determining being performed by the processor in an automated manner based on the lowest total energy at each stoichiometry or capacity, stored in the second data structure; and
    thereby determining the degradation dependent open cell voltage for the cathode material of the battery.

2. The computer-implemented method of claim 1, wherein the configurations with partial or complete blockage of the charge carrying sites comprise configurations with anti-sites formed by exchange of position of a transition metal atom with an alkali ion.

3. The computer-implemented method of claim 2, wherein the configurations comprise a framework of transition metal atoms from which alkali metal ions are removed during charging, and into which alkali metal ions can be replaced during discharging unless blocked by the degradation defects.

4. The computer-implemented method of claim 1, wherein the determining and storing in the third data structure of the open cell voltage of the cathode material at each stoichiometry or capacity, comprises determining, in an automated manner using the processor, a difference in chemical potential of a charge carrier in the cathode material versus a reference charge carrier electrode as a function of the charge carrier concentration.

5. The computer-implemented method of claim 1, wherein the cathode material comprises a transition metal and an alkali ion, and wherein the stoichiometry comprises concentration of the alkali ion.

6. The computer-implemented method of claim 1, wherein determining the degradation dependent model comprises determining, in an automated manner using the processor, the possible atomic configurations using a probabilistic model, and storing the possible atomic configurations in the first data structure.

7. The computer-implemented method of claim 1, wherein determining the degradation dependent model comprises determining, in an automated manner using the processor, the possible atomic configurations using at least one of: a Monte Carlo method, a genetic algorithm, and an enumeration search; and storing the possible atomic configurations in the first data structure.

8. The computer-implemented method of claim 1, wherein determining the degradation dependent model comprises modeling the atomic configurations, in an automated manner using the processor, using a quantum mechanical model of atoms of the cathode material.

9. The computer-implemented method of claim 8, wherein the quantum mechanical model comprises a model based on density functional theory, implemented in an automated manner using the processor.

10. The computer-implemented method of claim 1, further comprising:
    determining, in an automated manner using the processor, and storing in the third data structure, an open cell voltage of a first cathode material at each stoichiometry or capacity;
    determining, in an automated manner using the processor, and storing in a fourth data structure, an open cell voltage of a second cathode material at each stoichiometry or capacity;
    comparing, in an automated manner using the processor, an open cell voltage of the first cathode material from the third data structure with an open cell voltage of the second cathode material from the fourth data structure, and storing a result of the comparing in a fifth data structure; and
    reporting, in an automated manner using the processor, the result of the comparing of the open cell voltage of the first cathode material with the open cell voltage of the second cathode material.

11. A computer system for determining a degradation dependent open cell voltage for a cathode material of a battery, the computer system comprising:
    a degradation dependent modeling module configured to determine, in a manner automated by a processor, a degradation dependent model of the cathode material during operation of the battery, and to use the processor to store in memory the degradation dependent model in a first data structure comprising: (i) possible atomic configurations of the cathode material during operation of the battery at each of a plurality of stoichiometries or capacities of the cathode material, the possible atomic configurations comprising configurations with degradation defects produced by atomic rearrangements within the cathode material during operation of the battery, the configurations with degradation defects comprise configurations with partial or complete blockage of charge carrying sites within the cathode material, the atomic rearrangements comprising the partial or complete blockage of the charge carrying sites during operation of the battery, and (ii) the total energy of the possible atomic configurations;

a stable configuration module configured to determine and store in memory in a second data structure a lowest total energy atomic configuration of the cathode material and associated lowest total energy at each of the plurality of stoichiometries or capacities, the stable configuration module being configured to determine the lowest total energy atomic configuration and associated lowest total energy using the processor in an automated manner based on the degradation dependent model, stored in the first data structure, of the cathode material during operation; and an open cell voltage determination module configured to determine and store in memory in a third data structure an open cell voltage of the cathode material at each stoichiometry or capacity, and to thereby determine the degradation dependent open cell voltage for the cathode material of the battery, the open cell voltage determination module being configured to determine the open cell voltage using the processor in an automated manner based on the lowest total energy at each stoichiometry or capacity, stored in the second data structure.

12. The computer system of claim 11, wherein the configurations with partial or complete blockage of the charge carrying sites comprise configurations with anti-sites formed by exchange of position of a transition metal atom with an alkali ion.

13. The computer system of claim 12, wherein the configurations comprise a framework of transition metal atoms from which alkali metal ions are removed during charging, and into which alkali metal ions can be replaced during discharging unless blocked by the degradation defects.

14. The computer system of claim 11, wherein the open cell voltage determination module is configured to determine the open cell voltage of the cathode material at each stoichiometry or capacity by determining, in an automated manner using the processor, a difference in chemical potential of a charge carrier in the cathode material versus a reference charge carrier electrode as a function of the charge carrier concentration.

15. The computer system of claim 11, wherein the cathode material comprises a transition metal and an alkali ion, and wherein the stoichiometry comprises concentration of the alkali ion.

16. The computer system of claim 11, wherein the degradation dependent modeling module is configured to determine the degradation dependent model by determining, in an automated manner using the processor, the possible atomic configurations using a probabilistic model, and to store in memory the possible atomic configurations in the first data structure.

17. The computer system of claim 11, wherein the degradation dependent modeling module is configured to determine the degradation dependent model by determining, in an automated manner using the processor, the possible atomic configurations using at least one of: a Monte Carlo method, a genetic algorithm, and an enumeration search; and to store the possible atomic configurations in memory in the first data structure.

18. The computer system of claim 11, wherein the degradation dependent modeling module is configured to determine the degradation dependent model by modeling the atomic configurations, in an automated manner using the processor, using a quantum mechanical model of atoms of the cathode material.

19. The computer system of claim 18, wherein the quantum mechanical model comprises a model based on density functional theory, implemented in an automated manner using the processor.

20. The computer system of claim 11, further comprising:
a cathode materials comparison module configured to compare, in an automated manner using the processor, an open cell voltage of a first cathode material from the third data structure with an open cell voltage of a second cathode material from a fourth data structure, and to store in memory a result of the comparing in a fifth data structure; and
a reporting module configured to report, in an automated manner using the processor, the result from the fifth data structure of the comparing of the open cell voltage of the first cathode material with the open cell voltage of the second cathode material.

21. A non-transitory computer-readable medium configured to store instructions for determining a degradation dependent open cell voltage for a cathode material of a battery, the instructions, when loaded into working memory and executed by a processor, cause the processor to determine the degradation dependent open cell voltage for the cathode material of the battery by:

determining, in a manner automated by a processor, a degradation dependent model of the cathode material during operation of the battery, the degradation dependent model being stored in a first data structure by the processor and comprising: (i) possible atomic configurations of the cathode material during operation of the battery at each of a plurality of stoichiometries or capacities of the cathode material, the possible atomic configurations comprising configurations with degradation defects produced by atomic rearrangements within the cathode material during operation of the battery, the configurations with degradation defects comprising configurations with partial or complete blockage of charge carrying sites within the cathode material, the atomic rearrangements comprising the partial or complete blockage of the charge carrying sites during operation of the battery, and (ii) the total energy of the possible atomic configurations;

determining and storing in a second data structure a lowest total energy atomic configuration of the cathode material and associated lowest total energy at each of the plurality of stoichiometries or capacities, the determining being performed by the processor in an automated manner based on the degradation dependent model, stored in the first data structure, of the cathode material during operation;

determining and storing in a third data structure an open cell voltage of the cathode material at each stoichiometry or capacity, the determining being performed by the processor in an automated manner based on the lowest total energy at each stoichiometry or capacity, stored in the second data structure; and thereby determining the degradation dependent open cell voltage for the cathode material of the battery.

* * * * *